United States Patent
Wu et al.

(10) Patent No.: US 9,736,799 B2
(45) Date of Patent: Aug. 15, 2017

(54) SYNCHRONIZATION METHOD AND BASE STATION

(71) Applicant: Huawei Technologies Co., Ltd., Shenzhen, Guangdong (CN)

(72) Inventors: Qian Wu, Beijing (CN); Lixia Xue, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 14/623,389

(22) Filed: Feb. 16, 2015

(65) Prior Publication Data
US 2015/0163760 A1    Jun. 11, 2015

Related U.S. Application Data

(63) Continuation of application No. PCT/CN2012/080576, filed on Aug. 24, 2012.

(51) Int. Cl.
*H04W 56/00* (2009.01)
*H04W 92/20* (2009.01)

(52) U.S. Cl.
CPC ... *H04W 56/0005* (2013.01); *H04W 56/0015* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2006/0034250 A1* | 2/2006 | Kim | H04B 7/2696 370/350 |
| 2009/0097452 A1 | 4/2009 | Gogic | |
| 2010/0296491 A1 | 11/2010 | Wang et al. | |
| 2012/0020256 A1 | 1/2012 | Tujkovic et al. | |
| 2012/0184311 A1 | 7/2012 | Yamamoto et al. | |
| 2013/0003716 A1 | 1/2013 | Nanri et al. | |
| 2013/0010658 A1* | 1/2013 | Zhu | H04W 56/0015 370/280 |
| 2013/0136029 A1 | 5/2013 | Matsuo et al. | |

FOREIGN PATENT DOCUMENTS

| | | |
|---|---|---|
| CN | 1175593 C | 11/2004 |
| CN | 1201509 C | 5/2005 |
| CN | 101123465 A | 2/2008 |

(Continued)

*Primary Examiner* — Christine Duong (57) ABSTRACT

Embodiments of the present application provide a synchronization method and a base station. In the embodiments of the present application, a first base station receives, on at least one part of channels in a receiving band supported by the first base station, at least one first downlink synchronization signal sent by at least one second base station, and selects a first downlink synchronization signal from the at least one first downlink synchronization signal, to enable the first base station to execute time synchronization according to the selected first downlink synchronization signal, which can avoid a problem in the prior art of low reliability of time synchronization caused by low availability of a GPS signal, and relieve interference suffered by a base station from another base station caused by a problem of asynchronous receiving and sending time or inaccurate time synchronization, thereby improving signal quality of an air interface.

17 Claims, 3 Drawing Sheets

---

A first base station receives, on at least one part of channels in a receiving band supported by the first base station, at least one first downlink synchronization signal sent by at least one second base station ⟶ 101

The first base station selects a first downlink synchronization signal from the at least one first downlink synchronization signal ⟶ 102

The first base station executes time synchronization according to the selected first downlink synchronization signal ⟶ 103

(56) References Cited

FOREIGN PATENT DOCUMENTS

| | | |
|---|---|---|
| CN | 101932100 A | 12/2010 |
| CN | 101123468 B | 7/2011 |
| CN | 102227939 A | 10/2011 |
| EP | 0 732 817 A2 | 9/1996 |
| EP | 1 111 814 A2 | 6/2001 |
| JP | 2010-118726 A | 5/2010 |
| JP | 2010-147916 A | 7/2010 |
| JP | 2011-101347 A | 5/2011 |
| JP | 2011-114430 A | 6/2011 |
| JP | 2011-530864 A | 12/2011 |
| JP | 2014-506086 A | 3/2014 |
| WO | WO 00/62447 A1 | 10/2000 |
| WO | 2010/016955 A1 | 2/2010 |
| WO | 2011/043413 A1 | 4/2011 |
| WO | WO 2011/108202 A1 | 9/2011 |
| WO | 2012/029237 A1 | 3/2012 |
| WO | WO 2012/110863 A1 | 8/2012 |

\* cited by examiner

SYNCHRONIZATION METHOD AND BASE STATION

CROSS-REFERENCE TO RELATED APPLICATION

This application is a continuation of International Application No. PCT/CN2012/080576, filed on Aug. 24, 2012, which is hereby incorporated by reference in its entirety.

TECHNICAL FIELD

The present application relates to communications technologies, and in particular, to a synchronization method and a base station.

BACKGROUND

A wireless communication system, such as a long term evolution (Long Term Evolution, LTE) system, may include a time division duplex (Time Division Duplex, TDD) system. In the TDD system, a global positioning system (Global Positioning System, GPS) may be adopted to perform time synchronization between base stations using a same channel or different channels at a same band (Band).

However, because a GPS signal has low availability, for example, basically, no accurate GPS signal can be obtained indoors or when an obstruction exists, it is caused that reliability of the time synchronization is reduced, and therefore, a base station suffers interference from another base station because of inaccurate time synchronization, thereby resulting in reduction of signal quality of an air interface.

SUMMARY

Multiple aspects of the present application provide a synchronization method and a base station, including synchronization between base stations of different operators and between base stations of a same operator, to relieve interference suffered by a base station from another base station caused by asynchronous receiving and sending time or inaccurate time synchronization, thereby improving signal quality of an air interface.

In one aspect of the present application, a synchronization method is provided and includes:

receiving, by a first base station, on at least one part of channels in a receiving band supported by the first base station, at least one first downlink synchronization signal sent by at least one second base station;

selecting, by the first base station, a first downlink synchronization signal from the at least one first downlink synchronization signal; and executing, by the first base station, time synchronization according to the selected first downlink synchronization signal.

With reference to the foregoing aspect and any possible implementation manner, an implementation manner is further provided, where the selecting, by the first base station, a first downlink synchronization signal from the at least one first downlink synchronization signal includes:

receiving, by the first base station, on the at least one part of channels in the receiving band supported by the first base station, a first reference signal sent by the at least one second base station;

measuring, by the first base station, the first reference signal, to obtain signal intensity of the first reference signal; and selecting, by the first base station, the first downlink synchronization signal according to the signal intensity of the first reference signal.

With reference to the foregoing aspect and any possible implementation manner, an implementation manner is further provided, where the selecting, by the first base station, a first downlink synchronization signal from the at least one first downlink synchronization signal includes:

receiving, by the first base station, on the at least one part of channels, the first reference signal sent by the at least one second base station;

measuring, by the first base station, the first reference signal, to obtain the signal intensity of the first reference signal;

subtracting, by the first base station, an offset of the second base station relative to the first base station from the signal intensity of the first reference signal sent by each second base station, to obtain strength of interference caused by each second base station on a channel where the first base station currently works through sending signal on the at least one part of channels for the first base station; and selecting, by the first base station, the first downlink synchronization signal according to the strength of interference caused by each second base station on the channel where the first base station currently works through sending signal on the at least one part of channels for the first base station.

With reference to the foregoing aspect and any possible implementation manner, an implementation manner is further provided, where before the executing, by the first base station, time synchronization according to the selected first downlink synchronization signal, the method further includes:

receiving, by the first base station, on the at least one part of channels, subframe configuration information sent by the at least one second base station, where the subframe configuration information is used to indicate a working mode of a subframe of the second base station.

With reference to the foregoing aspect and any possible implementation manner, an implementation manner is further provided, where after the executing, by the first base station, time synchronization according to the selected first downlink synchronization signal, the method further includes:

configuring, by the first base station, a working mode of a subframe of the first base station according to the subframe configuration information sent by a second base station corresponding to the selected first downlink synchronization signal.

With reference to the foregoing aspect and any possible implementation manner, an implementation manner is further provided, where before the executing, by the first base station, time synchronization according to the selected first downlink synchronization signal, the method further includes:

sending, by the first base station, a random access signal to the second base station corresponding to the selected first downlink synchronization signal; and receiving, by the first base station, a timing advance TA value sent by the corresponding second base station, where the TA value is allocated by the corresponding second base station for the first base station according to the random access signal.

With reference to the foregoing aspect and any possible implementation manner, an implementation manner is further provided, where the executing, by the first base station, time synchronization according to the selected first downlink synchronization signal includes:

executing, by the first base station, the time synchronization according to the selected first downlink synchronization signal and the received TA value.

With reference to the foregoing aspect and any possible implementation manner, an implementation manner is further provided, where the executing, by the first base station, time synchronization according to the selected first downlink synchronization signal includes:

executing, by the first base station, the time synchronization according to the selected first downlink synchronization signal and the first reference signal sent by the second base station corresponding to the selected first downlink synchronization signal.

With reference to the foregoing aspect and any possible implementation manner, an implementation manner is further provided, where after the executing, by the first base station, time synchronization according to the selected first downlink synchronization signal, the method further includes:

receiving, by the first base station, according to working frequency information of the at least one second base station, on a channel indicated by the frequency information, a second downlink synchronization signal sent by the at least one second base station;

selecting, by the first base station, a second downlink synchronization signal from the second downlink synchronization signal; and executing, by the first base station, the time synchronization according to the selected second downlink synchronization signal.

With reference to the foregoing aspect and any possible implementation manner, an implementation manner is further provided, where the selecting, by the first base station, a second downlink synchronization signal from the second downlink synchronization signal includes:

receiving, by the first base station, according to the working frequency information of the at least one second base station, on the channel indicated by the frequency information, a second reference signal sent by the at least one second base station;

measuring, by the first base station, the second reference signal, to obtain signal intensity of the second reference signal; and selecting, by the first base station, a first downlink synchronization signal sent by a second base station corresponding to a second reference signal of strongest signal intensity in the second reference signal.

With reference to the foregoing aspect and any possible implementation manner, an implementation manner is further provided, where the selecting, by the first base station, a second downlink synchronization signal from the second downlink synchronization signal includes:

receiving, by the first base station, according to the working frequency information of the at least one second base station, on the channel indicated by the frequency information, the second reference signal sent by the at least one second base station;

measuring, by the first base station, the second reference signal, to obtain the signal intensity of the second reference signal;

subtracting, by the first base station, a preset offset of the at least one second base station relative to the first base station from the signal intensity of the second reference signal, to obtain strength of interference caused by the second base station on the channel where the first base station currently works through sending signal on the channel indicated by the frequency information for the first base station; and selecting, by the first base station, a second downlink synchronization signal sent by a second base station of strongest strength of interference.

With reference to the foregoing aspect and any possible implementation manner, an implementation manner is further provided, where before the receiving, by the first base station, according to working frequency information of the at least one second base station, on a channel indicated by the frequency information, a second downlink synchronization signal sent by the at least one second base station, the method further includes:

receiving, by the first base station, on the at least one part of channels, an operator identifier of an operator to which the at least one second base station belongs sent by the at least one second base station.

With reference to the foregoing aspect and any possible implementation manner, an implementation manner is further provided, where the receiving, by the first base station, according to working frequency information of the at least one second base station, on a channel indicated by the frequency information, a second downlink synchronization signal sent by the at least one second base station includes:

receiving, by the first base station, according to the working frequency information of the at least one second base station and the operator identifier, on the channel indicated by the frequency information, a second downlink synchronization signal sent by a part of second base stations in the at least one second base station, where the part of the second base stations belong to different operators.

In another aspect of the present application, a base station is provided and includes:

a receiving unit, configured to receive, on at least one part of channels in a receiving band supported by the base station, at least one first downlink synchronization signal sent by at least one second base station, and transmit the first downlink synchronization signal to a selecting unit;

the selecting unit, configured to select a first downlink synchronization signal from the at least one first downlink synchronization signal, and transmit the selected first downlink synchronization signal to a synchronizing unit; and the synchronizing unit, configured to execute time synchronization according to the first downlink synchronization signal selected by the selecting unit.

With reference to the foregoing aspect and any possible implementation manner, an implementation manner is further provided, where the base station further includes a first measuring unit, where the receiving unit is further configured to:

receive, on the at least one part of channels in the receiving band supported by the base station, a first reference signal sent by the at least one second base station, and transmit the first reference signal to the first measuring unit;

the first measuring unit is configured to:

measure the first reference signal, to obtain signal intensity of the first reference signal, and transmit the signal intensity of the first reference signal to the selecting unit; and the selecting unit is specifically configured to:

select the first downlink synchronization signal according to the signal intensity of the first reference signal; or subtract an offset of the second base station relative to the base station from the signal intensity of the first reference signal sent by each second base station, to obtain strength of interference caused by each second base station on a channel where the base station currently works through sending signal on the at least one part of channels for the base station, and select the first downlink synchronization signal according to the strength of interference caused by each second base station on the channel where the base station currently works through sending signal on the at least one part of channels for the base station.

With reference to the foregoing aspect and any possible implementation manner, an implementation manner is further provided, where the receiving unit is further configured to:

receive, on the at least one part of channels in the receiving band supported by the base station, subframe configuration information sent by the at least one second base station, where the subframe configuration information is used to indicate a working mode of a subframe of the second base station.

With reference to the foregoing aspect and any possible implementation manner, an implementation manner is further provided, where the base station further includes a configuring unit, where the receiving unit is further configured to transmit the subframe configuration information to the configuring unit; and the configuring unit is configured to:

configure a working mode of a subframe of the base station according to the subframe configuration information sent by a second base station corresponding to the first downlink synchronization signal selected by the selecting unit.

With reference to the foregoing aspect and any possible implementation manner, an implementation manner is further provided, where the base station further includes a sending unit, configured to:

send a random access signal to the second base station corresponding to the selected first downlink synchronization signal; where the receiving unit is further configured to:

receive a timing advance TA value sent by the corresponding second base station, and transmit the TA value to the synchronizing unit, where the TA value is allocated by the corresponding second base station for the base station according to the random access signal.

With reference to the foregoing aspect and any possible implementation manner, an implementation manner is further provided, where the synchronizing unit is specifically configured to:

execute the time synchronization according to the first downlink synchronization signal selected by the selecting unit and the TA value received by the receiving unit.

With reference to the foregoing aspect and any possible implementation manner, an implementation manner is further provided, where the receiving unit is further configured to transmit the first reference signal to the synchronizing unit; and the synchronizing unit is specifically configured to:

execute the time synchronization according to the first downlink synchronization signal selected by the selecting unit and the first reference signal sent by the second base station corresponding to the first downlink synchronization signal selected by the selecting unit.

With reference to the foregoing aspect and any possible implementation manner, an implementation manner is further provided, where the receiving unit is further configured to:

receive, according to working frequency information of the at least one second base station, on a channel indicated by the frequency information, a second downlink synchronization signal sent by the at least one second base station, and transmit the second downlink synchronization signal to the selecting unit;

the selecting unit is further configured to:

select a second downlink synchronization signal from the second downlink synchronization signal, and transmit the selected second downlink synchronization signal to the synchronizing unit; and the synchronizing unit is further configured to:

execute the time synchronization according to the selected second downlink synchronization signal.

With reference to the foregoing aspect and any possible implementation manner, an implementation manner is further provided, where the base station further includes a second measuring unit, where the receiving unit is further configured to:

receive, according to the working frequency information of the at least one second base station, on the channel indicated by the frequency information, a second reference signal sent by the at least one second base station, and transmit the second reference signal to the second measuring unit;

the second measuring unit is configured to:

measure the second reference signal, to obtain signal intensity of the second reference signal, and transmit the signal intensity of the second reference signal to the selecting unit; and the selecting unit is specifically configured to:

select a second downlink synchronization signal sent by a second base station corresponding to a second reference signal of strongest signal intensity in the second reference signal; or subtract a preset offset of the at least one second base station relative to the base station from the signal intensity of the second reference signal, to obtain strength of interference caused by the second base station on the channel where the base station currently works through sending signal on the channel indicated by the frequency information for the base station, and select a second downlink synchronization signal sent by a second base station of strongest strength of interference.

With reference to the foregoing aspect and any possible implementation manner, an implementation manner is further provided, where the receiving unit is further configured to:

receive, on the at least one part of channels in the receiving band supported by the base station, an operator identifier of an operator to which the at least one second base station belongs sent by the at least one second base station.

With reference to the foregoing aspect and any possible implementation manner, an implementation manner is further provided, where the receiving unit is specifically configured to:

receive, according to the working frequency information of the at least one second base station and the operator identifier, on the channel indicated by the frequency information, a second downlink synchronization signal sent by a part of second base stations in the at least one second base station, where the part of the second base stations belong to different operators.

In another aspect of the present application, a base station is provided and includes:

a receiver, configured to receive, on at least one part of channels in a receiving band supported by the base station, at least one first downlink synchronization signal sent by at least one second base station, and transmit the first downlink synchronization signal to a processor; and the processor, configured to select a first downlink synchronization signal from the at least one first downlink synchronization signal, and execute time synchronization according to the selected first downlink synchronization signal.

With reference to the foregoing aspect and any possible implementation manner, an implementation manner is further provided, where the receiver is further configured to:

receive, on the at least one part of channels in the receiving band supported by the base station, a first reference signal sent by the at least one second base station, and transmit the first reference signal to the processor; and the processor is specifically configured to:

measure the first reference signal, to obtain signal intensity of the first reference signal; and select a first downlink synchronization signal sent by a second base station corresponding to a first reference signal of strongest signal intensity in the first reference signal; or subtract a preset offset of the at least one second base station relative to the base station from the signal intensity of the first reference signal, to obtain strength of interference caused by the second base station on a channel where the base station currently works through sending signal on the at least one part of channels for the base station, and select a first downlink synchronization signal sent by a second base station of strongest strength of interference.

With reference to the foregoing aspect and any possible implementation manner, an implementation manner is further provided, where the receiver is further configured to:

receive, on the at least one part of channels in the receiving band supported by the base station, subframe configuration information sent by the at least one second base station, where the subframe configuration information is used to indicate a working mode of a subframe of the second base station.

With reference to the foregoing aspect and any possible implementation manner, an implementation manner is further provided, where the receiver is further configured to transmit the subframe configuration information to the processor; and the processor is further configured to:

configure a working mode of a subframe of the base station according to the subframe configuration information sent by a second base station corresponding to the selected first downlink synchronization signal.

With reference to the foregoing aspect and any possible implementation manner, an implementation manner is further provided, where the base station further includes a transmitter, configured to:

send a random access signal to the second base station corresponding to the selected first downlink synchronization signal; where the receiver is further configured to:

receive a TA value sent by the corresponding second base station, and transmit the TA value to the processor, where the TA value is allocated by the corresponding second base station for the base station according to the random access signal.

With reference to the foregoing aspect and any possible implementation manner, an implementation manner is further provided, where the processor is specifically configured to:

execute the time synchronization according to the selected first downlink synchronization signal and the TA value received by the receiver.

With reference to the foregoing aspect and any possible implementation manner, an implementation manner is further provided, where the receiver is further configured to transmit the first reference signal to the processor; and the processor is specifically configured to:

execute the time synchronization according to the selected first downlink synchronization signal and the first reference signal sent by the second base station corresponding to the selected first downlink synchronization signal.

With reference to the foregoing aspect and any possible implementation manner, an implementation manner is further provided, where the receiver is further configured to:

receive, according to working frequency information of the at least one second base station, on a channel indicated by the frequency information, a second downlink synchronization signal sent by the at least one second base station, and transmit the second downlink synchronization signal to the processor; and the processor is further configured to:

select a second downlink synchronization signal from the second downlink synchronization signal, and execute the time synchronization according to the selected second downlink synchronization signal.

With reference to the foregoing aspect and any possible implementation manner, an implementation manner is further provided, where the base station further includes the processor, where the receiver is further configured to:

receive, according to the working frequency information of the at least one second base station, on the channel indicated by the frequency information, a second reference signal sent by the at least one second base station, and transmit the second reference signal to the processor; and the processor is specifically configured to:

measure the second reference signal, to obtain signal intensity of the second reference signal; and select a first downlink synchronization signal sent by a second base station corresponding to a second reference signal of strongest signal intensity in the second reference signal; or subtract a preset offset of the at least one second base station relative to the base station from the signal intensity of the second reference signal, to obtain strength of interference caused by the second base station on the channel where the base station currently works through sending signal on the channel indicated by the frequency information for the base station, and select a second downlink synchronization signal sent by a second base station of strongest strength of interference.

With reference to the foregoing aspect and any possible implementation manner, an implementation manner is further provided, where the receiver is further configured to:

receive, on the at least one part of channels in the receiving band supported by the base station, an operator identifier of an operator to which the at least one second base station belongs sent by the at least one second base station.

With reference to the foregoing aspect and any possible implementation manner, an implementation manner is further provided, where the receiver is specifically configured to:

receive, according to the working frequency information of the at least one second base station and the operator identifier, on the channel indicated by the frequency information, a second downlink synchronization signal sent by a part of second base stations in the at least one second base station, where the part of the second base stations belong to different operators.

It can be known from the foregoing technical solutions that, in the embodiments of the present application, a first base station receives, on at least one part of channels in a receiving band supported by the first base station, at least one first downlink synchronization signal sent by at least one second base station, and selects a first downlink synchronization signal from the at least one first downlink synchronization signal, to enable the first base station to execute time synchronization according to the selected first downlink synchronization signal, which can avoid a problem in the prior art of low reliability of time synchronization caused by low availability of a GPS signal, and relieve interference suffered by a base station from another base station caused by a problem of asynchronous receiving and sending time or inaccurate time synchronization, thereby improving signal quality of an air interface.

BRIEF DESCRIPTION OF THE DRAWINGS

To describe the technical solutions in the embodiments of the present application or in the prior art more clearly, the following briefly introduces accompanying drawings required for describing the embodiments or the prior art. Apparently, the accompanying drawings in the following description show merely some embodiments of the present application, and persons of ordinary skill in the art may still derive other drawings according to these accompanying drawings without creative efforts.

DETAILED DESCRIPTION

To make the objectives, technical solutions, and advantages of the embodiments of the present application more comprehensible, the following clearly describes the technical solutions in the embodiments of the present application with reference to the accompanying drawings in the embodiments of the present application. Apparently, the embodiments to be described are merely a part rather than all of the embodiments of the present application. All other embodiments obtained by persons of ordinary skill in the art based on the embodiments of the present application without creative efforts shall fall within the protection scope of the present application.

Moreover, the term "and/or" herein merely describes an association relationship between associated objects, and indicates that three relationships may exist, for example, A and/or B may indicate three cases: A exists alone, A and B exist at the same time, and B exists alone. In addition, the character "/" herein usually indicates that the former and later associated objects are in an "or" relationship.

Figure 1:
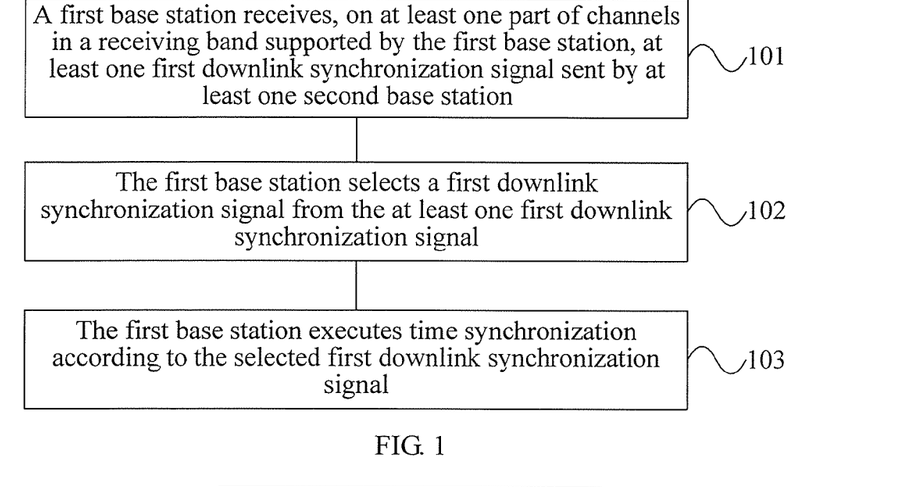
FIG. 1 is a schematic flow chart of a synchronization method provided in an embodiment of the present application.

FIG. 1 is a schematic flow chart of a synchronization method provided in an embodiment of the present application, as shown in FIG. 1.

101: A first base station receives, on at least one part of channels in a receiving band supported by the first base station, at least one first downlink synchronization signal sent by at least one second base station.

The first base station and the second base station belong to a same geographical area, and specifically, may belong to different operators, or may also belong to a same operator, which is not limited in this embodiment.

102: The first base station selects a first downlink synchronization signal from the at least one first downlink synchronization signal.

103: The first base station executes time synchronization according to the selected first downlink synchronization signal.

The first downlink synchronization signal may include, but is not limited to, a primary synchronization signal (Primary Synchronization Signal, PSS) and/or a secondary synchronization signal (Secondary Synchronization Signal, SSS).

Optionally, in a possible implementation manner of this embodiment, the at least one first downlink synchronization signal sent by the at least one second base station may be different. In another possible implementation manner of this embodiment, when the at least one second base station is a base station group (that is, a second base station group), the at least one first downlink synchronization signal sent by the at least one second base station may be the same.

Optionally, during synchronization tracking, because a transmitter of the first base station interferes with a receiver, time for receiving a first synchronization signal in 101 is staggered with transmitting time. However, during initial synchronization, because the transmitter is shut down, the time for receiving the first synchronization signal is not limited.

Optionally, in a possible implementation manner of this embodiment, 103 may specifically include:

the first base station obtains frame synchronization information according to the selected first downlink synchronization signal, where the frame synchronization information includes at least one piece of the following information: initial time of a frame, a frame period, initial time of a super-frame and a super-frame period; and the first base station executes the time synchronization according to the frame synchronization information.

Optionally, in a possible implementation manner of this embodiment, the at least one part of channels in the receiving band may be all channels in the receiving band.

Optionally, in a possible implementation manner of this embodiment, the at least one part of channels in the receiving band may be a part of channels in all channels in the receiving band. Specifically, the first base station may specifically determine a part of channels in all the channels in the receiving band according to pre-configured configuration information.

Optionally, 101 may specifically include:

the first base station receives, through searching in multiple sub-bands sequentially, at least one first downlink synchronization signal sent by the at least one second base station, where the multiple sub-bands are in the receiving band supported by the first base station. For example, in a possible implementation manner of this embodiment, in 101, the first base station may specifically scan, at a preset channel bandwidth, such as 20 MHz, the at least one part of channels in the receiving band supported by the first base station, to receive, on the at least one part of channels in the receiving band, at least one first downlink synchronization signal sent by the at least one second base station.

It can be understood that, the first downlink synchronization signal sent by the second base station is not necessarily on all the at least one part of channels, that is to say, even though the first base station scans the at least one part of channels, what the first base station receives may be the first downlink synchronization signal sent by the second base station on a part of channels. Understanding about the at least one part of channels in the following may also be processed in the same manner.

It can be understood that, when the first base station fails to receive any first downlink synchronization signal on a certain receiving threshold, it indicates that, in this geographical area, there is still no strong interference base station (that is, the second base station) in an operating state in the band, synchronization time of the first base station may be set randomly, and the first base station starts to send a first synchronization signal on the at least one part of channels, in preset time and at a certain period. Frame synchronization information included in the first synchronization signal sent by the first base station may be preset by an operator to which the first base station belongs, or may be obtained according to preset absolute time. The frame synchronization information may include at least one piece of the following information: the initial time of the frame, the frame period, the initial time of the super-frame and the super-frame period.

Optionally, in a possible implementation manner of this embodiment, in 102, the first base station may specifically receive, on the at least one part of channels in the receiving band supported by the first base station, a first reference signal sent by the at least one second base station; then, the first base station may measure the first reference signal, to obtain signal intensity of the first reference signal; so far, the first base station may select a first downlink synchronization signal sent by a second base station corresponding to a first reference signal of strongest signal intensity in the first reference signal, which can effectively improve reliability of the time synchronization and relieve interference suffered by a base station from another base station caused by a problem of inaccurate time synchronization.

Optionally, in a possible implementation manner of this embodiment, in 102, the first base station may specifically receive, on the at least one part of channels in the receiving band supported by the first base station, the first reference signal sent by the at least one second base station; then, the first base station may measure the first reference signal, to obtain the signal intensity of the first reference signal; next, the first base station may subtract an offset of the second base station relative to the first base station, where the offset is preset or obtained through a temporary handshake, from the signal intensity of the first reference signal sent by each second base station, to obtain strength of interference caused by each second base station on a channel where the first base station currently works through sending signal on the at least one part of channels for the first base station, where the offset is suppression of a corresponding part of channels where the first reference signal is received relative to the channel where the first base station currently works; so far, the first base station may select, in several base stations of strongest strength of interference after the offset is adjusted, a first downlink synchronization signal sent by a second base station (or a second base station group sending the same first downlink synchronization signal). A selecting rule may be selecting the strongest, or selecting other stronger second base stations in consideration of other factors. The strength of interference caused by the second base station to the first base station is considered, which can more effectively improve the reliability of the time synchronization, and relieve the interference suffered by the base station from the another base station caused by the problem of the inaccurate time synchronization.

For example, if the second base station is a co-channel base station of the first base station, an offset corresponding to the second base station is 0; if the second base station is an adjacent channel base station of the first base station, the offset corresponding to the second base station is a number greater than 0.

It can be understood that, the first base station first needs to synchronize with the at least one second base station, and then receives, on the at least one part of channels in the receiving band supported by the first base station, the first reference signal sent by the at least one second base station.

Optionally, in a possible implementation manner of this embodiment, before 103, the first base station may further receive, on the at least one part of channels in the receiving band supported by the first base station, subframe configuration information sent by the at least one second base station, where the subframe configuration information is used to indicate a working mode of a subframe of the second base station.

The working mode of the subframe of the second base station indicated by the subframe configuration information may include, but is not limited to, at least one of an uplink transmission mode, a downlink transmission mode and an uplink and downlink joining mode (such as a special timeslot in TD-LTE).

Optionally, in a possible implementation manner of this embodiment, after 103, the first base station may further configure a working mode of a subframe of the first base station according to the subframe configuration information sent by a second base station corresponding to the selected first downlink synchronization signal.

For example, when configuring the subframe, the first base station may configure, according to the working mode of the subframe corresponding to the second base station, for the subframe, a working mode the same as the working mode of the subframe corresponding to the second base station, and in this way, the first base station may not suffer interference from the second base station, thereby improving signal quality of an air interface.

For another example, when configuring the subframe, the first base station may configure, according to the working mode of the subframe corresponding to the second base station, for the subframe, a working mode different from or opposite to the working mode of the subframe corresponding to the second base station, and in this way, the first base station may suffer interference from the second base station, thereby reducing the signal quality of the air interface. Therefore, the first base station needs to further adopt an interference reduction technology, which is used to reduce the interference suffered by the first base station from the second base station, thereby achieving an objective of avoiding reduction of the signal quality of the air interface.

Optionally, in a possible implementation manner of this embodiment, before 103, the first base station may further send a random access signal to the second base station or the second base station group (when the first downlink synchronization signal is corresponding to the second base station group) corresponding to the selected first downlink synchronization signal; then, the first base station receives a timing advance (Timing Advance, TA for short) value sent by the corresponding second base station. The TA value is allocated by the corresponding second base station for the first base station according to the random access signal. For resource allocation of the random access signal used for synchronization between base stations, a random access process of a common terminal may be followed, or a special ID group and random access resource allocation may be reserved to distinguish a base station and a common terminal which need to be accessed randomly.

Optionally, in a possible implementation manner of this embodiment, in 103, the first base station may specifically execute the time synchronization according to the selected first downlink synchronization signal and the received TA value, which can effectively improve the reliability of the time synchronization, and relieve the interference suffered by the base station from the another base station caused by the problem of the inaccurate time synchronization. When multiple second base stations of strong signal intensity when receiving the first synchronization signal exist, multiple TA values are obtained. When the time synchronization is executed, adjustment is performed uniformly according to a minimum or maximum value of the multiple TA values and a linear and non-linear average. When the TA value cannot be obtained timely, or it is hard to make a choice among the multiple TA values, synchronization adjustment may be made according to an experience TA value (for example, a TA value may be derived according to a delay corresponding to average station spacing deployed in a cell).

Optionally, in a possible implementation manner of this embodiment, in 103, the first base station may specifically execute the time synchronization according to the selected first downlink synchronization signal and the first reference signal sent by the second base station corresponding to the selected first downlink synchronization signal, such as a cell-specific reference signal (Cell-specific Reference Signal, CRS), which can effectively improve the reliability of the time synchronization, and relieve the interference suffered by the base station from the another base station caused by the problem of inaccurate time synchronization.

Optionally, in a possible implementation manner of this embodiment, after 103, in an operation process, when the first base station finds that system performance degrades severely, for example, the first base station may collect statistics about its block error rate (Block Error Rate, BLER), when the BLER is greater than or equal to a preset threshold of the block error rate, it is considered that the system performance degrades severely; for another example, the first base station may measure a sounding reference signal (Sounding Reference Signal, SRS), if a measuring result is less than a preset measuring threshold, it is considered that the system performance degrades severely, and in this case, the first base station needs to trigger new time synchronization. Specifically, the first base station may further receive, according to working frequency information of the at least one second base station, on a channel indicated by the frequency information, a second downlink synchronization signal sent by the at least one second base station; then, the first base station may select a second downlink synchronization signal from the second downlink synchronization signal; so far, the first base station may execute the time synchronization according to the selected second downlink synchronization signal.

Optionally, in a possible implementation manner of this embodiment, the first base station may specifically execute 101 to 103 periodically to trigger the new time synchronization. Specifically, the first base station may further receive, according to the working frequency information of the at least one second base station, on the channel indicated by the frequency information, the second downlink synchronization signal sent by the at least one second base station; then, the first base station may select a second downlink synchronization signal from the second downlink synchronization signal; so far, the first base station may execute the time synchronization according to the selected second downlink synchronization signal.

Optionally, the first base station may also execute the time synchronization according to a synchronization signal sent by a terminal under the second base station. The synchronization signal of the terminal under the second base station has a certain relationship with the second downlink synchronization signal of the second base station, and there is a determined delay. The first base station may receive the synchronization signal of the terminal of the second base station and the determined delay to indirectly obtain the frame synchronization information of the second base station.

For example, the first base station may specifically receive, according to the working frequency information of the at least one second base station, on the channel indicated by the frequency information, a second reference signal sent by the at least one second base station; then, the first base station may measure the second reference signal, to obtain signal intensity of the second reference signal; so far, the first base station may select a first downlink synchronization signal sent by a second base station corresponding to a second reference signal of strongest signal intensity in the second reference signal.

For example, the first base station may specifically receive, according to the working frequency information of the at least one second base station, on the channel indicated by the frequency information, the second reference signal sent by the at least one second base station; then, the first base station may measure the second reference signal, to obtain the signal intensity of the second reference signal; next, the first base station may subtract a preset offset of the at least one second base station relative to the first base station from the signal intensity of the second reference signal, to obtain strength of interference caused by the second base station on the channel where the first base station currently works through sending signal on the channel indicated by the frequency information for the first base station, where the offset is suppression of the channel indicated by the frequency information relative to the channel where the first base station currently works; so far, the first base station may select a second downlink synchronization signal sent by a second base station of strongest strength of interference.

For example, if the second base station is a co-channel base station of the first base station, an offset corresponding to the second base station is 0; if the second base station is an adjacent channel base station of the first base station, the offset corresponding to the second base station is a number greater than 0.

Further, optionally, the first base station may further receive, on the at least one part of channels in the receiving band supported by the first base station, an operator identifier of an operator to which the at least one second base station belongs sent by the at least one second base station; correspondingly, because synchronization time of a base station managed by each operator may be set to same time by the operator, the first base station may specifically receive, according to the working frequency information of the at least one second base station and the operator identifier, on the channel indicated by the frequency information, a second downlink synchronization signal sent by a part of second base stations in the at least one second base station, where the part of the second base stations belong to different operators.

It can be understood that, a process that the first base station executes the time synchronization according to the selected second downlink synchronization signal is similar to 103. For detailed description, reference may be made to relevant content of 103, and details are not repeatedly described herein.

It can be understood that, to avoid a problem of frequently executing a synchronization process, the first base station executing the time synchronization twice needs a period of time as an interval, to ensure that the base station resides in a current state for a period of time.

In this embodiment, a first base station receives, on at least one part of channels in a receiving band supported by the first base station, at least one first downlink synchronization signal sent by at least one second base station, and selects a first downlink synchronization signal from the at least one first downlink synchronization signal, to enable the first base station to execute time synchronization according to the selected first downlink synchronization signal, which can avoid a problem in the prior art of low reliability of time synchronization caused by low availability of a GPS signal, and relieve interference suffered by a base station from another base station caused by a problem of asynchronous receiving and sending time or inaccurate time synchronization, thereby improving signal quality of an air interface.

It should be noted that, for simplicity of description, the foregoing method embodiments are expressed as combinations of a series of actions. However, persons skilled in the art should know that, the present application is not limited by the described sequence of the actions, because according to the present application, some steps may be performed by adopting other sequences or simultaneously. Second, persons skilled in the art should also know that, the embodiments described in the specification are exemplary embodiments, and involved actions and modules are not necessarily required by the present application.

In the foregoing embodiments, description of the embodiments has different emphases. For a part of a certain embodiment which is not described in detail, reference may be made to relevant description of other embodiments.

Figure 2:
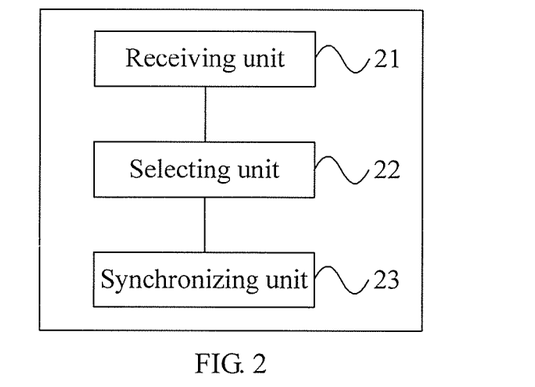
FIG. 2 is a schematic structural diagram of a base station provided in another embodiment of the present application.

FIG. 2 is a schematic structural diagram of a base station provided in another embodiment of the present application, and as shown in FIG. 2, the base station in this embodiment may include a receiving unit 21, a selecting unit 22 and a synchronizing unit 23. The receiving unit 21 is configured to receive, on at least one part of channels in a receiving band supported by the base station, at least one first downlink synchronization signal sent by at least one second base station, and transmit the first downlink synchronization signal to the selecting unit 22; the selecting unit 22 is configured to select a first downlink synchronization signal from the at least one first downlink synchronization signal, and transmit the selected first downlink synchronization signal to the synchronizing unit 23; and the synchronizing unit 23 is configured to execute time synchronization according to the first downlink synchronization signal selected by the selecting unit 22.

The base station and the second base station belong to a same geographical area, and specifically, may belong to different operators, or may also belong to a same operator, which is not limited in this embodiment.

The first downlink synchronization signal may include, but is not limited to, a primary synchronization signal (Primary Synchronization Signal, PSS) and/or a secondary synchronization signal (Second Synchronization Signal, SSS).

Optionally, in a possible implementation manner of this embodiment, the at least one part of channels in the receiving band may be all channels in the receiving band.

Optionally, in a possible implementation manner of this embodiment, the at least one part of channels in the receiving band may be a part of channels in all the channels in the receiving band. Specifically, the first base station may specifically determine a part of channels in all the channels in the receiving band according to pre-configured configuration information.

Figure 3:
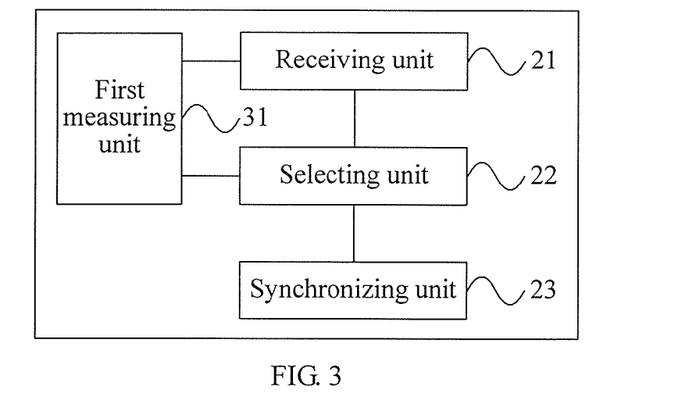
FIG. 3 is a schematic structural diagram of a base station provided in another embodiment of the present application.

Optionally, in a possible implementation manner of this embodiment, as shown in FIG. 3, the base station may further include a first measuring unit 31, and the receiving unit 21 may further receive, on the at least one part of channels in the receiving band supported by the base station, a first reference signal sent by the at least one second base station, and transmit the first reference signal to the first measuring unit 31; correspondingly, the first measuring unit 31 is configured to measure the first reference signal, to obtain signal intensity of the first reference signal, and transmit the signal intensity of the first reference signal to the selecting unit 22. Specifically, the selecting unit 22 may specifically select a first downlink synchronization signal sent by a second base station corresponding to a first reference signal of strongest signal intensity in the first reference signal, or subtract a preset offset of the at least one second base station relative to the base station from the signal intensity of the first reference signal, to obtain strength of interference caused by the second base station on a channel where the base station currently works through sending signal on the at least one part of channels for the base station, and select a first downlink synchronization signal sent by a second base station of strongest strength of interference.

Optionally, in a possible implementation manner of this embodiment, the receiving unit 21 may further receive, on the at least one part of channels in the receiving band supported by the base station, subframe configuration information sent by the at least one second base station, where the subframe configuration information is used to indicate a working mode of a subframe of the second base station.

The working mode of the subframe of the second base station indicated by the subframe configuration information may include, but is not limited to, at least one of an uplink transmission mode and a downlink transmission mode.

Figure 4:
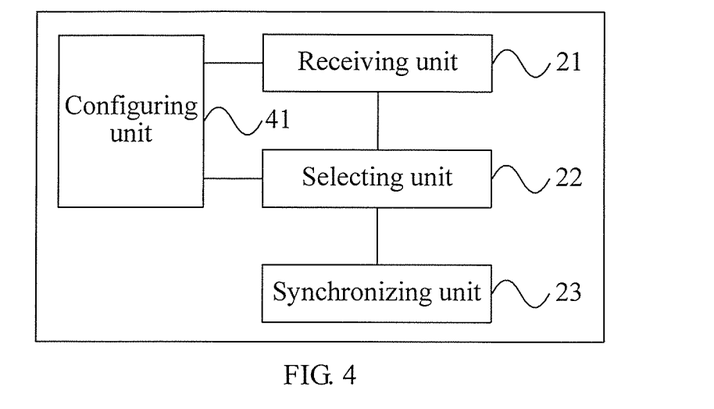
FIG. 4 is a schematic structural diagram of a base station provided in another embodiment of the present application.

Optionally, in a possible implementation manner of this embodiment, as shown in FIG. 4, the base station may further include a configuring unit 41, and the receiving unit 21 may further transmit the subframe configuration information to the configuring unit 41; correspondingly, the configuring unit 41 is configured to configure a working mode of a subframe of the base station according to the subframe configuration information sent by a second base station corresponding to the first downlink synchronization signal selected by the selecting unit 22.

Figure 5:
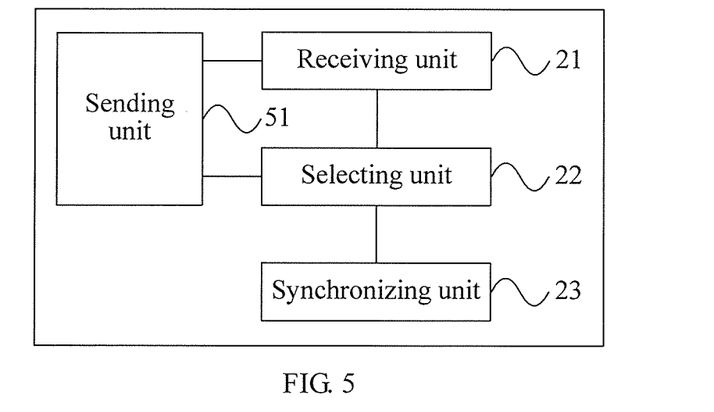
FIG. 5 is a schematic structural diagram of a base station provided in another embodiment of the present application.

Optionally, in a possible implementation manner of this embodiment, as shown in FIG. 5, the base station may further include a sending unit 51, configured to send a random access signal to the second base station corresponding to the selected first downlink synchronization signal; correspondingly, the receiving unit 21 may further receive a TA value sent by the corresponding second base station, and transmit the TA value to the synchronizing unit 23, where the TA value is allocated by the corresponding second base station for the base station according to the random access signal.

Specifically, the synchronizing unit 23 may specifically execute the time synchronization according to the first downlink synchronization signal selected by the selecting unit 22 and the TA value received by the receiving unit 21, which can effectively improve reliability of the time synchronization, and relieve interference suffered by the base station from another base station caused by a problem of inaccurate time synchronization.

Optionally, in a possible implementation manner of this embodiment, the receiving unit 21 is further configured to transmit the first reference signal to the synchronizing unit 23; specifically, the synchronizing unit 23 may specifically execute the time synchronization according to the first downlink synchronization signal selected by the selecting unit 22 and the first reference signal sent by the second base station corresponding to the first downlink synchronization signal selected by the selecting unit 22, which can effectively improve the reliability of the time synchronization, and relieve the interference suffered by the base station from the another base station caused by the problem of the inaccurate time synchronization.

Optionally, in a possible implementation manner of this embodiment, in an operation process, when the base station finds that system performance degrades severely, for example, the base station may collect statistics about its block error rate (Block Error Rate, BLER), when the BLER is greater than or equal to a preset threshold of the block error rate, it is considered that the system performance degrades severely; for another example, the base station may measure a sounding reference signal (Sounding Reference Signal, SRS), if a measuring result is less than a preset measuring threshold, it is considered that the system performance degrades severely, and in this case, the base station needs to trigger new time synchronization. Specifically, the receiving unit 21 may further receive, according to working frequency information of the at least one second base station, on a channel indicated by the frequency information, a second downlink synchronization signal sent by the at least one second base station, and transmit the second downlink synchronization signal to the selecting unit 22; correspondingly, the selecting unit 22 may further select a second downlink synchronization signal from the second downlink synchronization signal, and transmit the selected second downlink synchronization signal to the synchronizing unit 23; and the synchronizing unit 23 may further execute the time synchronization according to the selected second downlink synchronization signal.

Figure 6:
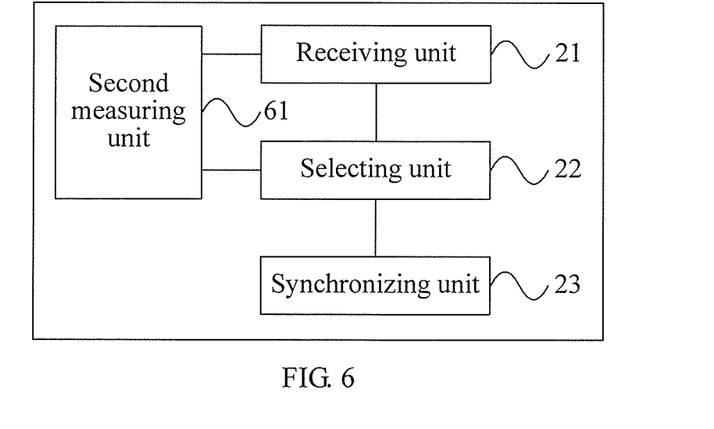
FIG. 6 is a schematic structural diagram of a base station provided in another embodiment of the present application.

For example, as shown in FIG. 6, the base station may further include a second measuring unit 61, and the receiving unit 21 may further receive, according to the working frequency information of the at least one second base station, on the channel indicated by the frequency information, a second reference signal sent by the at least one second base station, and transmit the second reference signal to the second measuring unit 61; correspondingly, the second measuring unit 61 is configured to measure the second reference signal, to obtain signal intensity of the second reference signal, and transmit the signal intensity of the second reference signal to the selecting unit 22; specifically, the selecting unit 22 may specifically select a second downlink synchronization signal sent by a second base station corresponding to a second reference signal of strongest signal intensity in the second reference signal, or subtract a preset offset of the at least one second base station relative to the base station from the signal intensity of the second reference signal, to obtain strength of interference caused by the second base station on the channel where the base station currently works through sending signal on the channel indicated by the frequency information for the base station, and select a second downlink synchronization signal sent by a second base station of strongest strength of interference.

Further, optionally, the receiving unit 21 may further receive, on the at least one part of channels in the receiving band supported by the base station, an operator identifier of an operator to which the at least one second base station belongs sent by the at least one second base station.

Optionally, because synchronization time of a base station managed by each operator may be set to same time by the operator, the receiving unit 21 may specifically receive, according to the working frequency information of the at least one second base station and the operator identifier, on the channel indicated by the frequency information, a second downlink synchronization signal sent by a part of second base stations in the at least one second base station, where the part of the second base stations belong to different operators.

It can be understood that, a process that the synchronizing unit 23 executes the time synchronization according to the second downlink synchronization signal selected by the selecting unit 22 is similar to a process that the synchronizing unit 23 executes the time synchronization according to the first downlink synchronization signal selected by the selecting unit 22. For detailed description, reference may be made to relevant content about that the synchronizing unit 23 executes the time synchronization according to the first downlink synchronization signal selected by the selecting unit 22, and details are not repeatedly described herein.

In this embodiment, a base station receives, through a receiving unit, on at least one part of channels in a receiving band supported by the base station, at least one first downlink synchronization signal sent by at least one second base station, and a selecting unit selects a first downlink synchronization signal from the at least one first downlink synchronization signal, to enable a synchronizing unit to execute time synchronization according to the first downlink synchronization signal selected by the selecting unit, which can avoid a problem in the prior art of low reliability of time synchronization caused by low availability of a GPS signal, and relieve interference suffered by a base station from another base station caused by a problem of asynchronous receiving and sending time or inaccurate time synchronization, thereby improving signal quality of an air interface.

Figure 7:
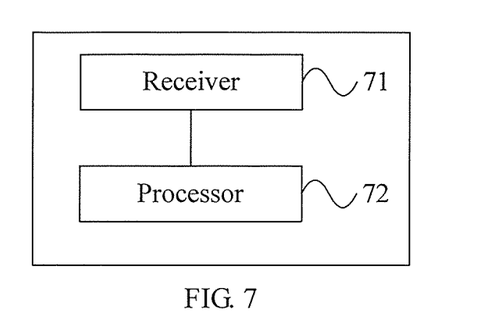
FIG. 7 is a schematic structural diagram of a base station provided in another embodiment of the present application.

FIG. 7 is a schematic structural diagram of a base station provided in another embodiment of the present application, and as shown in FIG. 7, the base station in this embodiment may include a receiver 71 and a processor 72. The receiver 71 is configured to receive, on at least one part of channels in a receiving band supported by the base station, at least one first downlink synchronization signal sent by at least one second base station, and transmit the first downlink synchronization signal to the processor 72; and the processor 72 is configured to select a first downlink synchronization signal from the at least one first downlink synchronization signal, and execute time synchronization according to the selected first downlink synchronization signal.

The base station and the second base station belong to a same geographical area, and specifically, may belong to different operators, or may also belong to a same operator, which is not limited in this embodiment.

The first downlink synchronization signal may include, but is not limited to, a primary synchronization signal (Primary Synchronization Signal, PSS) and/or a secondary synchronization signal (Second Synchronization Signal, SSS).

Optionally, in a possible implementation manner of this embodiment, the at least one part of channels in the receiving band may be all channels in the receiving band.

Optionally, in a possible implementation manner of this embodiment, the at least one part of channels in the receiving band may be a part of channels in all the channels in the receiving band. Specifically, the first base station may specifically determine a part of channels in all the channels in the receiving band according to pre-configured configuration information.

Optionally, in a possible implementation manner of this embodiment, the receiver 71 may further receive, on the at least one part of channels in the receiving band supported by the base station, a first reference signal sent by the at least one second base station, and transmit the first reference signal to the processor 72; correspondingly, the processor 72 is specifically configured to measure the first reference signal, to obtain signal intensity of the first reference signal; and select a first downlink synchronization signal sent by a second base station corresponding to a first reference signal of strongest signal intensity in the first reference signal, or subtract a preset offset of the at least one second base station relative to the base station from the signal intensity of the first reference signal, to obtain strength of interference caused by the second base station on a channel where the base station currently works through sending signal on the at least one part of channels for the base station, and select a first downlink synchronization signal sent by a second base station of strongest strength of interference.

Optionally, in a possible implementation manner of this embodiment, the receiver 71 may further receive, on the at least one part of channels in the receiving band supported by the base station, subframe configuration information sent by the at least one second base station, where the subframe configuration information is used to indicate a working mode of a subframe of the second base station.

The working mode of the subframe of the second base station indicated by the subframe configuration information may include, but is not limited to, at least one of an uplink transmission mode and a downlink transmission mode.

Optionally, in a possible implementation manner of this embodiment, the receiver 71 may further transmit the subframe configuration information to the processor 72; correspondingly, the processor 72 is further configured to configure a working mode of a subframe of the base station according to the subframe configuration information sent by a second base station corresponding to the selected first downlink synchronization signal.

Figure 8:
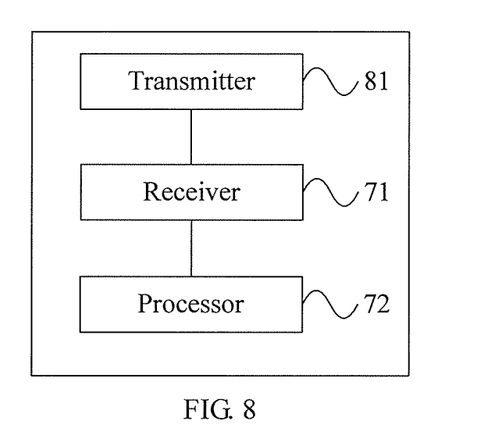
FIG. 8 is a schematic structural diagram of a base station provided in another embodiment of the present application.

Optionally, in a possible implementation manner of this embodiment, as shown in FIG. 8, the base station may further include a transmitter 81, configured to send a random access signal to the second base station corresponding to the selected first downlink synchronization signal; correspondingly, the receiver 71 may further receive a TA value sent by the corresponding second base station, and transmit the TA value to the processor 72, where the TA value is allocated by the corresponding second base station for the base station according to the random access signal.

Specifically, the processor 72 may specifically execute the time synchronization according to the selected first downlink synchronization signal and the TA value received by the receiver 71, which can effectively improve reliability of the time synchronization, and relieve interference suffered by the base station from another base station caused by a problem of inaccurate time synchronization.

Optionally, in a possible implementation manner of this embodiment, the receiver 71 is further configured to transmit the first reference signal to the processor 72; specifically, the processor 72 may specifically execute the time synchronization according to the selected first downlink synchronization signal and the first reference signal sent by the second base station corresponding to the selected first downlink synchronization signal, which can effectively improve the reliability of the time synchronization, and relieve the interference suffered by the base station from the another base station caused by the problem of the inaccurate time synchronization.

Optionally, in a possible implementation manner of this embodiment, in an operation process, when the base station finds that system performance degrades severely, for example, the base station may collect statistics about its block error rate (Block Error Rate, BLER), when the BLER is greater than or equal to a preset threshold of the block error rate, it is considered that the system performance degrades severely; for another example, the base station may measure a sounding reference signal (Sounding Reference Signal, SRS), if a measuring result is less than a preset measuring threshold, it is considered that the system performance degrades severely, and in this case, the base station needs to trigger new time synchronization. Specifically, the receiver 71 may further receive, according to working frequency information of the at least one second base station, on a channel indicated by the frequency information, a second downlink synchronization signal sent by the at least one second base station, and transmit the second downlink synchronization signal to the processor 72; correspondingly, the processor 72 may further select a second downlink synchronization signal from the second downlink synchronization signal, and execute the time synchronization according to the selected second downlink synchronization signal.

For example, the receiver 71 may further receive, according to the working frequency information of the at least one second base station, on the channel indicated by the frequency information, a second reference signal sent by the at least one second base station, and transmit the second reference signal to the processor 72; correspondingly, the processor 72 is specifically configured to measure the second reference signal, to obtain signal intensity of the second reference signal; and select a second downlink synchronization signal sent by a second base station corresponding to a second reference signal of strongest signal intensity in the second reference signal; or subtract a preset offset of the at least one second base station relative to the base station from the signal intensity of the second reference signal, to obtain strength of interference caused by the second base station on the channel indicated by the frequency information for the base station on the channel where the base station currently works, and select a second downlink synchronization signal sent by a second base station of strongest strength of interference.

Further, optionally, the receiver 71 may further receive, on the at least one part of channels in the receiving band supported by the base station, an operator identifier of an operator to which the at least one second base station belongs sent by the at least one second base station.

Optionally, because synchronization time of a base station managed by each operator may be set to same time by the operator, the receiver 71 may specifically receive, according to the working frequency information of the at least one second base station and the operator identifier, on the channel indicated by the frequency information, a second downlink synchronization signal sent by a part of second base stations in the at least one second base station, where the part of the second base stations belong to different operators.

It can be understood that, a process that the processor 72 executes the time synchronization according to the selected second downlink synchronization signal is similar to a process that the processor 72 executes the time synchronization according to the selected first downlink synchronization signal. For detailed description, reference may be made to relevant content about that the processor 72 executes the time synchronization according to the selected first downlink synchronization signal, and details are not repeatedly described herein.

In this embodiment, a base station receives, through a receiver, on at least one part of channels in a receiving band supported by the base station, at least one first downlink synchronization signal sent by at least one second base station, and a processor selects a first downlink synchronization signal from the at least one first downlink synchronization signal, to enable the processor to execute time synchronization according to the first downlink synchronization signal selected by the selecting unit, which can avoid a problem in the prior art of low reliability of time synchronization caused by low availability of a GPS signal, and relieve interference suffered by a base station from another base station caused by a problem of asynchronous receiving and sending time or inaccurate time synchronization, thereby improving signal quality of an air interface.

The processor in the foregoing embodiments may be a baseband processor.

Persons skilled in the art may clearly understand that, for the purpose of convenient and brief description, for a detailed working process of the foregoing system, apparatus, and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, dividing of the units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may also be implemented in a form of hardware plus a software functional unit.

The integrated unit implemented in a form of software functional unit may be stored in a computer readable storage medium. The foregoing software functional unit is stored in a storage medium, and includes several instructions for instructing a computer device (which may be a personal computer, a server, or a network equipment, or the like) or a processor (processor) to perform a part of the steps of the methods described in the embodiments of the present application. The foregoing storage medium includes: any medium that is capable of storing program codes, such as a USB flash disk, a removable hard disk, a read-only memory (Read-Only Memory, ROM), a random access memory (Random Access Memory, RAM), a magnetic disk, or an optical disk.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent replacements to some technical features of the technical solutions described in the foregoing embodiments; however, these modifications or replacements do not make the essence of the corresponding technical solutions depart from the spirit and scope of the technical solutions of the embodiments of the present invention.

What is claimed is:

1. A synchronization method, comprising:
  receiving, by a first base station, on at least one part of channels in a receiving band supported by the first base station, at least one first downlink synchronization signal sent by at least one second base station;
  selecting, by the first base station, a first downlink synchronization signal from the at least one first downlink synchronization signal;
  executing, by the first base station, time synchronization according to the selected first downlink synchronization signal;
  wherein selecting, by the first base station, a first downlink synchronization signal from the at least one first downlink synchronization signal comprises:
    receiving, by the first base station, on the at least one part of channels, a first reference signal sent by the at least one second base station;
    measuring, by the first base station, the first reference signal, to obtain a signal intensity of the first reference signal;
    subtracting, by the first base station, an offset of each of the second base station relative to the first base station from the signal intensity of the first reference signal sent by each of the second base station, to obtain strength of interference caused by each of the second base station on a channel where the first base station currently works through sending signal on the at least one part of channels for the first base station; and
    selecting, by the first base station, the first downlink synchronization signal according to the strength of interference caused by each of the second base station on the channel where the first base station currently works through sending signal on the at least one part of channels of the first base station.

2. The method according to claim 1, wherein selecting the first downlink synchronization signal further comprises:

selecting, by the first base station, a first downlink synchronization signal sent by a second base station of strongest strength of interference.

3. The method according to claim 1, wherein before executing, by the first base station, time synchronization according to the selected first downlink synchronization signal, the method further comprises:

receiving, by the first base station, on the at least one part of channels, subframe configuration information sent by the each of the second base station, wherein the subframe configuration information is used to indicate a working mode of a subframe of each of the second base station.

4. The method according to claim 3, wherein after executing, by the first base station, time synchronization according to the selected first downlink synchronization signal, the method further comprises:

configuring, by the first base station, a working mode of a subframe of the first base station according to the subframe configuration information sent by a second base station corresponding to the selected first downlink synchronization signal.

5. The method according claim 1, wherein after executing, by the first base station, time synchronization according to the selected first downlink synchronization signal, the method further comprises:

receiving, by the first base station, according to working frequency information of the at least one second base station, on a channel indicated by the frequency information, a second downlink synchronization signal sent by the at least one second base station;

selecting, by the first base station, a second downlink synchronization signal from the second downlink synchronization signal; and executing, by the first base station, the time synchronization according to the selected second downlink synchronization signal.

6. The method according to claim 5, wherein selecting the second downlink synchronization signal from the second downlink synchronization signal comprises:

receiving, by the first base station, according to the working frequency information of the at least one second base station, on the channel indicated by the frequency information, a second reference signal sent by the at least one second base station;

measuring, by the first base station, the second reference signal, to obtain signal intensity of the second reference signal; and selecting, by the first base station, a first downlink synchronization signal sent by a second base station corresponding to a second reference signal of strongest signal intensity in the second reference signal.

7. The method according to claim 6, wherein selecting the second downlink synchronization signal from the second downlink synchronization signal further comprises:

receiving, by the first base station, according to the working frequency information of the at least one second base station, on the channel indicated by the frequency information, a second reference signal sent by the at least one second base station;

measuring, by the first base station, the second reference signal, to obtain signal intensity of the second reference signal;

subtracting, by the first base station, a preset offset of each of the second base station relative to the first base station from the signal intensity of the second reference signal, to obtain strength of interference caused by the second base station on the channel where the first base station currently works through sending signal on the channel indicated by the frequency information for the first base station; and selecting, by the first base station, a second downlink synchronization signal sent by a second base station of strongest strength of interference.

8. The method according to claim 5, wherein before receiving the second downlink synchronization signal sent by the at least one second base station, the method further comprises:

receiving, by the first base station, on the at least one part of channels, an operator identifier of an operator to which the at least one second base station belongs sent by the at least one second base station.

9. The method according to claim 5, wherein receiving the second downlink synchronization signal sent by the at least one second base station comprises:

receiving, by the first base station, according to the working frequency information of the at least one second base station and the operator identifier, on the channel indicated by the frequency information, a second downlink synchronization signal sent by a part of second base stations in the at least one second base station, wherein the part of the second base stations belong to different operators.

10. A base station, comprising:

a processor; and a receiver coupled to the processor, the receiver configured to:

receive, on at least one part of channels in a receiving band supported by the base station, at least one first downlink synchronization signal sent by at least one second base station, and transmit the first downlink synchronization signal to a processor; and receive, on the at least one part of channels, a first reference signal sent by the at least one second base station, and transmit the first reference signal to the processor;

the processor configured to:

select a first downlink synchronization signal from the at least one first downlink synchronization signal, and execute time synchronization according to the selected first downlink synchronization signal;

measure the first reference signal, to obtain signal intensity of the first reference signal; and subtract a preset offset of each of the at least one second base station relative to the base station from the signal intensity of the first reference signal, to obtain strength of interference caused by each of the second base station on a channel where the base station currently works through sending signal on the at least one part of channels for the base station, and select a first downlink synchronization signal sent by a second base station of strongest strength of interference.

11. The base station according to claim 10, wherein the receiver is further configured to:

receive, on the at least one part of channels, subframe configuration information sent by the each of the second base station, wherein the subframe configuration information is used to indicate a working mode of a subframe of each of the second base station.

12. The base station according to claim 11, wherein:
the receiver is further configured to transmit the subframe configuration information to the processor; and
the processor is further configured to configure a working mode of a subframe of the base station according to the subframe configuration information sent by a second base station corresponding to the selected first downlink synchronization signal.

13. The base station according to claim 10, wherein:
the receiver is further configured to:
receive, according to working frequency information of the at least one second base station, on a channel indicated by the frequency information, a second downlink synchronization signal sent by the at least one second base station, and transmit the second downlink synchronization signal to the processor; and
the processor is further configured to:
select a second downlink synchronization signal from the second downlink synchronization signal, and execute the time synchronization according to the selected second downlink synchronization signal.

14. The base station according to claim 13, wherein:
the receiver is further configured to:
receive, according to the working frequency information of the at least one second base station, on the channel indicated by the frequency information, a second reference signal sent by the at least one second base station, and transmit the second reference signal to the processor; and
the processor is configured to:
measure the second reference signal, to obtain signal intensity of the second reference signal, and
select a first downlink synchronization signal sent by a second base station corresponding to a second reference signal of strongest signal intensity in the second reference signal; or subtract a preset offset of each of the second base station relative to the base station from the signal intensity of the second reference signal, to obtain strength of interference caused by the second base station on the channel where the base station currently works through sending signal on the channel indicated by the frequency information for the base station, and select a second downlink synchronization signal sent by a second base station of strongest strength of interference.

15. The base station according to claim 13, wherein the receiver is further configured to:
receive, on the at least one part of channels, an operator identifier of an operator to which the at least one second base station belongs sent by the at least one second base station.

16. The base station according to claim 13, wherein the receiver is configured to:
receive, according to the working frequency information of the at least one second base station and the operator identifier, on the channel indicated by the frequency information, a second downlink synchronization signal sent by a part of second base stations in the at least one second base station, wherein the part of the second base stations belong to different operators.

17. A synchronization method, the method comprising:
receiving, by a first base station, on at least one part of channels in a receiving band supported by the first base station, at least one first downlink synchronization signal sent by at least one second base station;
selecting, by the first base station, a first downlink synchronization signal from the at least one first downlink synchronization signal;
executing, by the first base station, time synchronization according to the selected first downlink synchronization signal;
receiving, by the first base station, according to working frequency information of the at least one second base station, on a channel indicated by the frequency information, a second downlink synchronization signal sent by the at least one second base station;
selecting, by the first base station, a second downlink synchronization signal from the second downlink synchronization signal;
executing, by the first base station, the time synchronization according to the selected second downlink synchronization signal;
wherein selecting, by the first base station, the second downlink synchronization signal from the second downlink synchronization signal comprises:
receiving, by the first base station, according to the working frequency information of the at least one second base station, on the channel indicated by the frequency information, a second reference signal sent by the at least one second base station;
measuring, by the first base station, the second reference signal, to obtain signal intensity of the second reference signal;
selecting, by the first base station, a first downlink synchronization signal sent by a second base station corresponding to a second reference signal of strongest signal intensity in the second reference signal;
receiving, by the first base station, according to the working frequency information of the at least one second base station, on the channel indicated by the frequency information, a second reference signal sent by the at least one second base station;
measuring, by the first base station, the second reference signal, to obtain signal intensity of the second reference signal;
subtracting, by the first base station, a preset offset of each of the second base station relative to the first base station from the signal intensity of the second reference signal, to obtain strength of interference caused by the second base station on the channel where the first base station currently works through sending signal on the channel indicated by the frequency information for the first base station; and
selecting, by the first base station, a second downlink synchronization signal sent by a second base station of strongest strength of interference.

* * * * *